US012751572B2

(12) United States Patent
Khizar et al.

(10) Patent No.: US 12,751,572 B2
(45) **Date of Patent: *Oct. 6, 2026**

(54) MICROWAVABLE DISH

(71) Applicant: WHIRLPOOL CORPORATION, Benton Harbor, MI (US)

(72) Inventors: Muhammad Khizar, Saint Joseph, MI (US); Mark E. Ecklund, Conroe, TX (US); Chris A. Lundberg, Kingwood, TX (US); Ermanno Buzzi, Varese (IT)

(73) Assignee: Whirlpool Corporation, Benton Harbor, MI (US)

( * ) Notice: Subject to any disclaimer, the term of this patent is extended or adjusted under 35 U.S.C. 154(b) by 424 days.

This patent is subject to a terminal disclaimer.

(21) Appl. No.: 18/223,880

(22) Filed: Jul. 19, 2023

(65) Prior Publication Data

US 2023/0363580 A1 Nov. 16, 2023

Related U.S. Application Data

(63) Continuation of application No. 16/711,622, filed on Dec. 12, 2019, now Pat. No. 11,744,399.

(51) Int. Cl.
*A47J 36/02* (2006.01)
*A47G 19/02* (2006.01)

(52) U.S. Cl.
CPC .......... *A47J 36/027* (2013.01); *A47G 19/027* (2013.01)

(58) Field of Classification Search
CPC ............................. A47G 19/027; A47J 36/027
USPC ......................... 219/725, 730, 731, 744, 759
See application file for complete search history.

(56) References Cited

U.S. PATENT DOCUMENTS 4,398,077 A * 8/1983 Freedman ............ H05B 6/6494 426/243
4,450,334 A 5/1984 Bowen et al.
7,025,213 B2 * 4/2006 Chen ........................ A47J 43/24 210/474
11,744,399 B2 * 9/2023 Khizar .................. A47J 36/027 219/725
2007/0029316 A1 2/2007 Fernandez
(Continued)

FOREIGN PATENT DOCUMENTS

CN 303868103 S 9/2016
CN 110403445 A 11/2019
(Continued)

OTHER PUBLICATIONS

Microwave Crisper Pan Available at https://www.walmart.com/ip/Microwave-Crisper-Pan/41494963, Accessed Dec. 11, 2019.
(Continued)

*Primary Examiner* — Quang T Van
(74) *Attorney, Agent, or Firm* — McGarry Bair PC

(57) ABSTRACT

A microwavable dish having a body with a microwave-absorbing coating. A bottom of the microwavable dish or the microwave-absorbing coating defines or includes a dome portion. The microwave-absorbing coating can be coupled to or formed with the bottom of the microwavable dish. The microwave-absorbing coating provides heat to the body by transforming microwaves to heat. The microwave-absorbing coating can include a plurality of nubs, where each nub has a height and a nub diameter.

20 Claims, 8 Drawing Sheets

(56) References Cited

U.S. PATENT DOCUMENTS

| | | | |
|---|---|---|---|
| 2018/0220500 | A1 | 8/2018 | Staton et al. |
| 2019/0292675 | A1 | 9/2019 | Lin et al. |

FOREIGN PATENT DOCUMENTS

| | | | |
|---|---|---|---|
| FR | 2694876 | A1 | 2/1994 |
| FR | 2732577 | A1 | 10/1996 |
| FR | 2867346 | A1 | 9/2005 |
| GB | 2252027 | A | 7/1992 |

OTHER PUBLICATIONS

Pizza Pan Available at https://www.shopatdean.com/products/american-metalcraft-nctp10-10-pizza-pan-with-nibs, Accessed Dec. 11, 2019.

Microwave Crisper Pan Available at http://www.bta-mall.com/product_detail.php?id=skub00kiam2jo, Accessed Dec. 11, 2019.

European Search Report for Counterpart EP20203695.0, 7 Pages, Dated Mar. 19, 2021.

* cited by examiner

MICROWAVABLE DISH

CROSS REFERENCE TO RELATED APPLICATION(S)

This application is a continuation of and claims priority to and benefit of U.S. patent application Ser. No. 16/711,622, filed Dec. 12, 2019, now U.S. Pat. No. 11,744,399, issued Sep. 5, 2023, which is incorporated herein by reference in its entirety.

FIELD OF THE INVENTION

This disclosure generally relates to a microwavable dish for containing food for heating in a microwave. More specifically, the disclosure relates to the structure of the microwavable dish with a microwave-absorbing coating.

BACKGROUND

Compared to a traditional oven, a microwave oven can enable fast and economical heat treatment of food by heating or exciting particles within the food. However, microwave ovens do not provide the "browning effect" produced by traditional ovens whose thermal action is exerted from the outside to the inside of the food.

To overcome this drawback, microwavable dishes are provided with a microwavable coating that absorbs electromagnetic radiation. The absorption helps to heat the microwavable dish so that the food in the microwavable dish can be heated from the outside, similar to the traditional oven. The microwavable coating is often applied to the back or bottom side for of the microwavable dishes. However, even with the microwavable coating, food often has unwanted browning in some areas while leaving other parts of the food uncooked.

BRIEF DESCRIPTION

In one aspect, the present disclosure relates to a microwavable dish that includes a body having a top and an opposing bottom, a surface adapted to hold a food item defined by the top, a dome portion defined by the bottom, and a microwave-absorbing, nanoparticle coating applied to at least a portion of the dome portion forming or coating a plurality of projecting nubs.

In another aspect, the present disclosure relates to a microwavable dish that includes a top having a surface adapted to hold a food item and to reflect microwaves, a bottom in opposing relationship to the top and having a concave dome portion that is adapted to absorb microwaves, sides that extend away from the bottom and define a bottom perimeter at a location where the sides join the bottom, wherein the concave dome portion extends downwardly away from and below the bottom perimeter, a plurality of nubs projecting from the concave dome portion, and a microwave-absorbing, nanoparticle coating applied to at least a portion of the dome portion forming or coating a plurality of projecting nubs.

DETAILED DESCRIPTION

Figure 1:
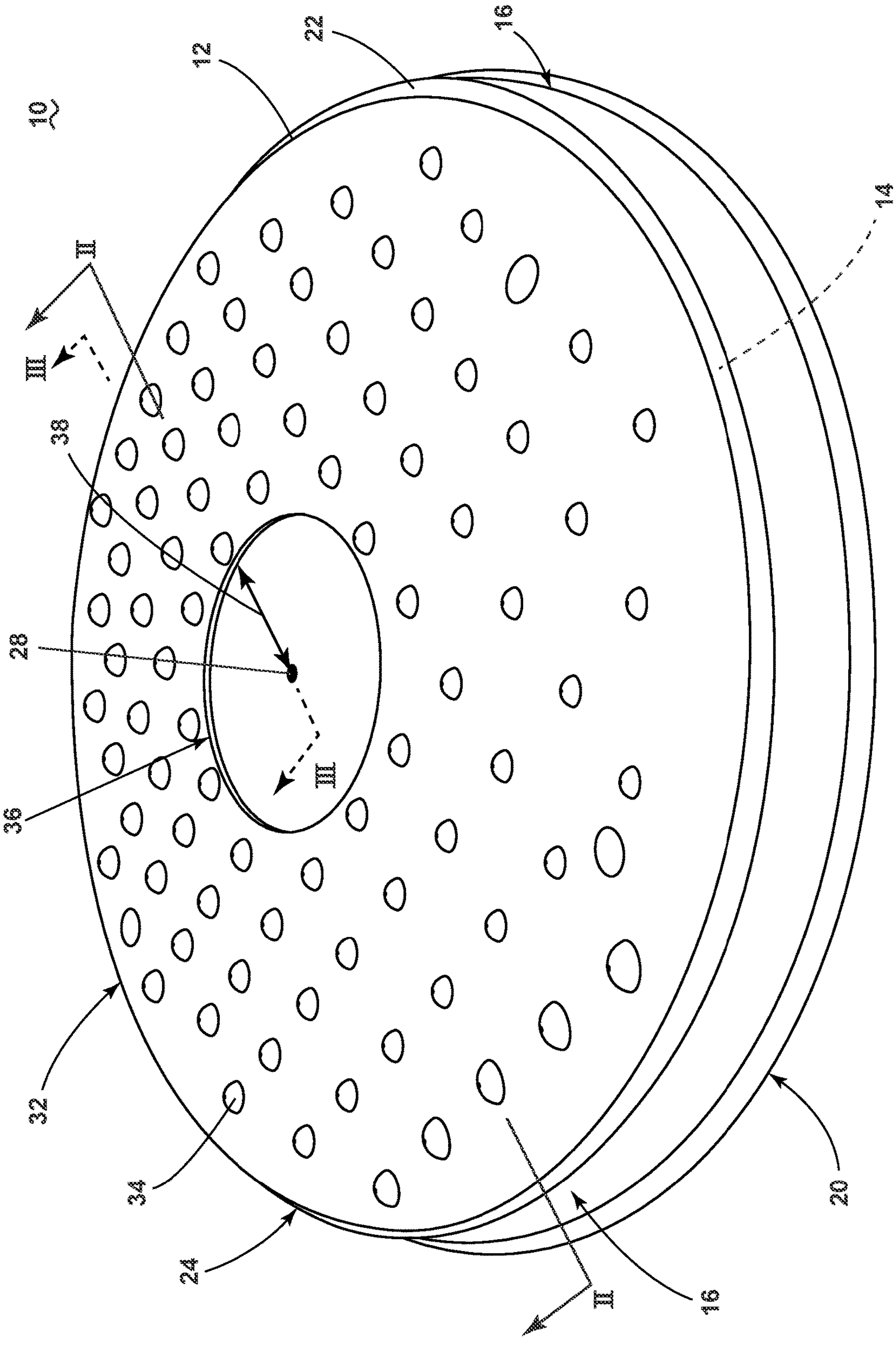
FIG. 1 is a bottom perspective view of a microwavable dish.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 illustrates a microwavable dish 10 having a bottom 12 in opposing relationship to a top 14. Optionally, the microwavable dish 10 can include sides 16 that generally extend away from the bottom 12. The sides 16 can extend from the bottom 12 and protrude beyond the top 14. A body 20 can be defined by the top 14, the bottom 12 and the sides 16. The body 20 can be made of non-microwave-absorbable material that generally reflects microwaves. For example, the body 20 can be aluminum. The term "reflects microwaves" or "non-microwave-absorbable" as used herein describes a material that reflects more microwaves than it absorbs. The term "microwave-absorbing" as used herein describes a material that absorbs more microwaves than it reflects.

A bottom perimeter 22 can be defined at the location where the sides 16 join the bottom 12 of the body 20. The bottom 12 can include a microwave-absorbing dome portion 24. The dome portion 24 is illustrated as concave, however it is contemplated that the dome portion 24 can be convex relative to the top 14.

An apex 28 of the dome portion 24 can be defined as the point on the dome portion 24 or the bottom 12 furthest from a plane containing the bottom perimeter 22.

The dome portion 24 can include a microwave-absorbing coating 32 that can at least partially render the dome portion 24 of the microwaveable dish 10 as microwave-absorbing. The coating 32 can couple to the body 20 of the microwavable dish 10 at the bottom 12. Alternatively, or in addition, it will be understood that the bottom 12, including the dome portion 24 can be formed in whole or in part of a microwave absorbing material. A plurality of microwave-absorbing nubs 34 can extend from the dome portion 24 or bottom 12.

As illustrated by way of non-limiting example, the nubs 34 can be arranged in a matrix having rows and columns where the rows are generally perpendicular to the columns. It is contemplated, however, that the nubs 34 can be equally spaced from each other in any distribution on the dome portion 24 or they can be variably spaced from each other.

Further illustrated, by way of non-limiting example, is a circular area 36 centered on the apex 28 having an arc representative of a radius 38 from which the nubs 34 are absent. The circular area 36 can be in the center of the dome portion 24 and have an area between 0 and 75 percent of the total surface area of the dome portion 24. The total surface area of the dome portion 24 or the circular area 36 can be found using any known means of calculating surface area.

Figure 2:
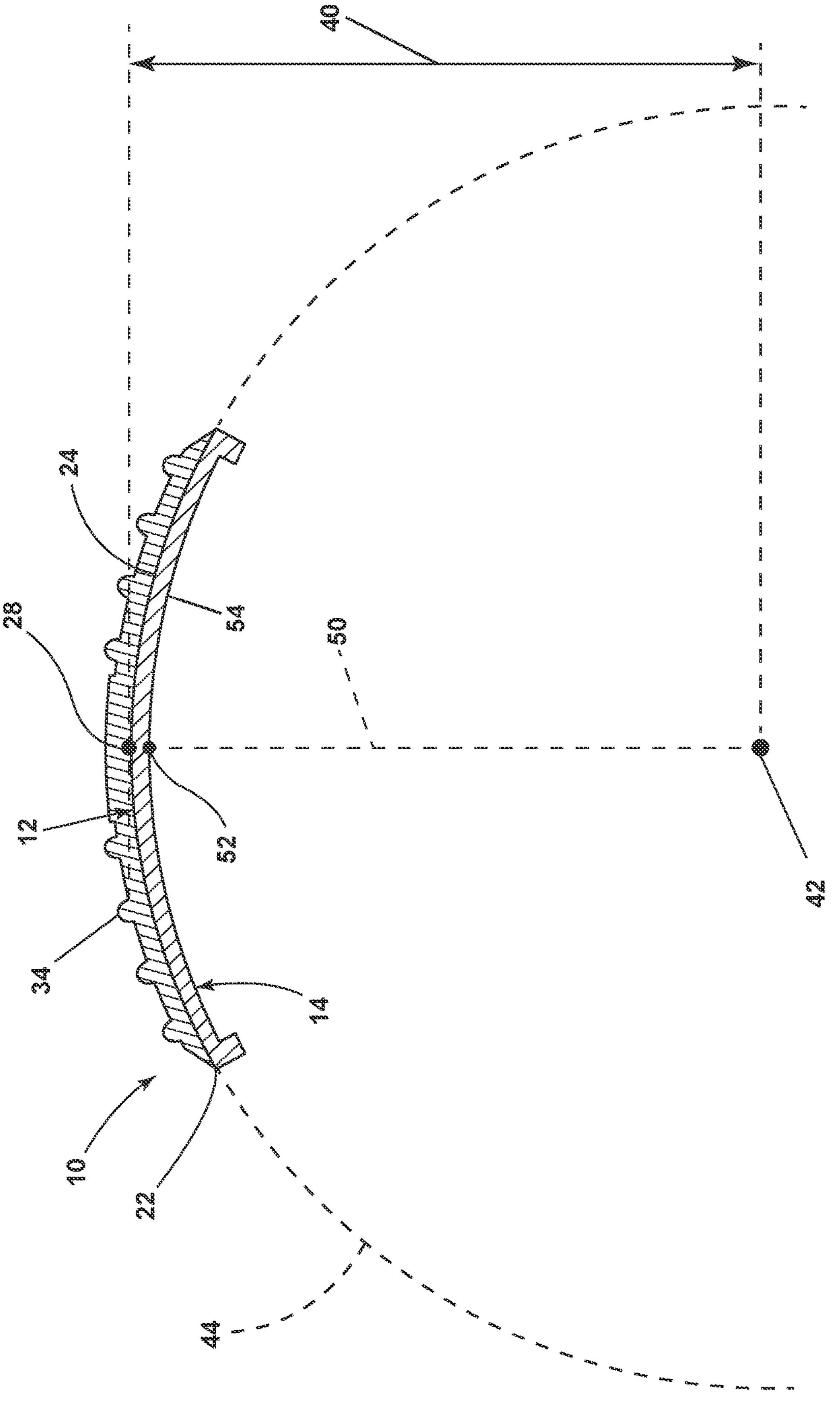
FIG. 2 is a schematic cross section of the microwavable dish 10 of FIG. 1 along line II-II.

FIG. 2 is a schematic cross section of the microwavable dish 10. The domed portion 24 of the microwavable dish 10 can have a radius of curvature 40 illustrated as extending from the apex 28 to a center point 42. The center point 42 can be the center of a circle 44 which is at least in part defined by the dome portion 24. An imaginary line 50 can extend from the center point 42 to the apex 28.

A surface 54 adapted to hold a food item can be defined by the top 14. A geometric center 52 of the surface 54 or the top 14 of the microwavable dish 10 can be a location relatively equidistance from the sides 16 of the microwavable dish 10 along the top 14. The line 50 can pass through the center point 42 and the geometric center 52, therefore the geometric center 52 can be defined as the intersection of the top 14 and the line 50.

Figure 3:
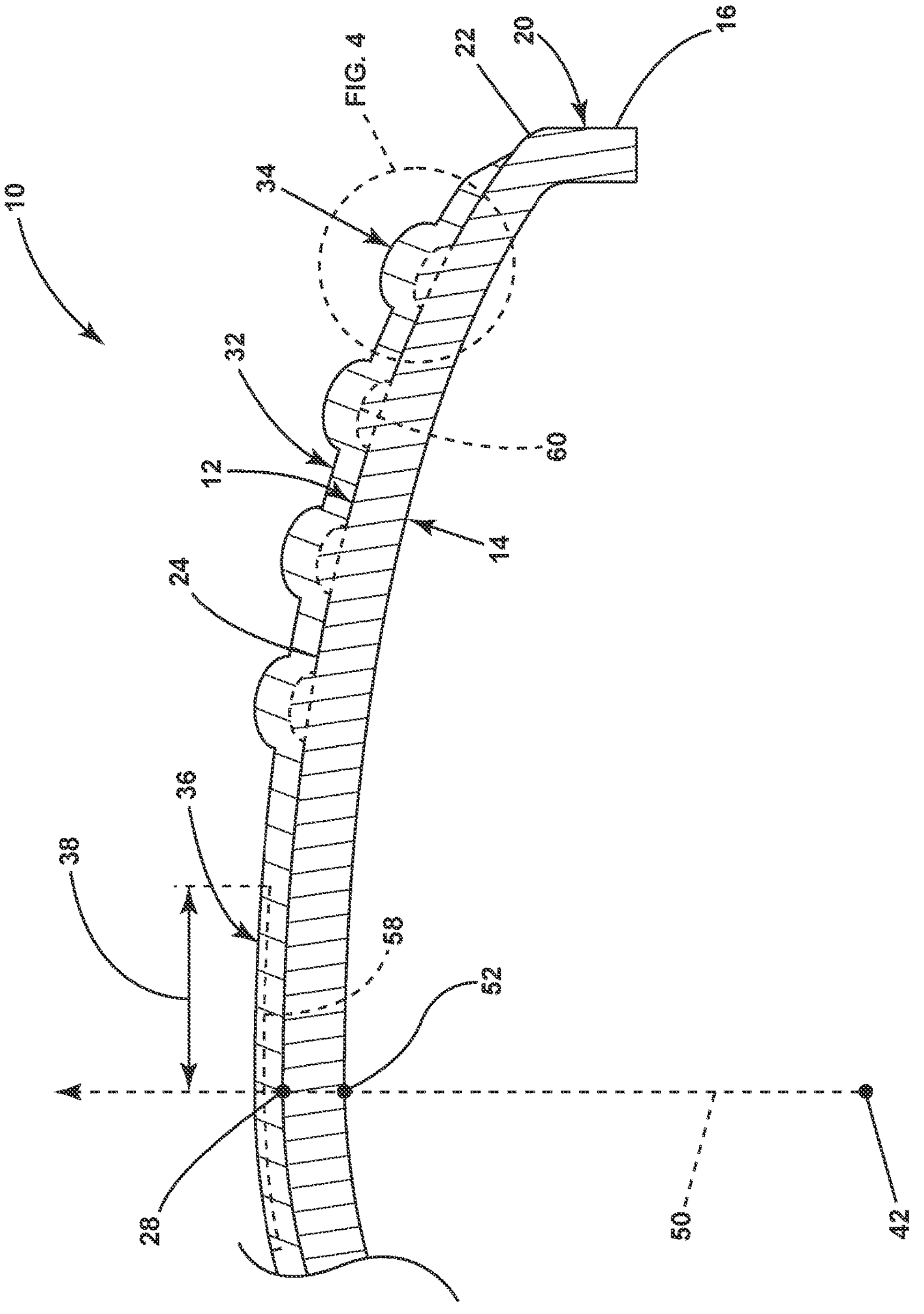
FIG. 3 a schematic cross section of a portion of the microwave dish of FIG. 1 along line III-III.

FIG. 3 is a schematic cross section of a portion of the microwave dish 10 further illustrating that the circular area 36 is centered on the apex 28. As illustrated, the circular area 36 can have the same radius of curvature 40 as the dome portion 24. Alternatively, the circular area 36 can have a radius of curvature that is greater than or less than the dome portion 24. The radius 38 of the circular area 36 can be up to at least 50% of the radius of curvature 40. Optionally, the coating 32 at the circular area 36 can be recessed, defining a pocket 58. However, it is contemplated that the coating 32 can be raised or include at least one topographical feature at any point of the dome portion 24.

The coating 32 can be thickened to form the nubs 34. Alternatively, the coating 32 can be applied to optional protrusions 60 that extend from the bottom 12 of the body 20, where the nubs 34 are formed from the protrusions 60 and the coating 32 that covers the protrusions 60.

The coating 32 can include at least one different material than the body 20. It is contemplated that the coating 32 can include a plurality of nanoparticles, such as, but not limited to carbon nanotubes, graphene, carbon nanofibrils, or any combination of these materials. Additionally, or alternatively, the coating 32 can be made from ceramic composites that include by way of non-limited example, nanocrystalline ceramic nanoparticles. Alternatively, the microwave-absorbing coating 32 can include some of the same material as the body 20.

Figure 4:
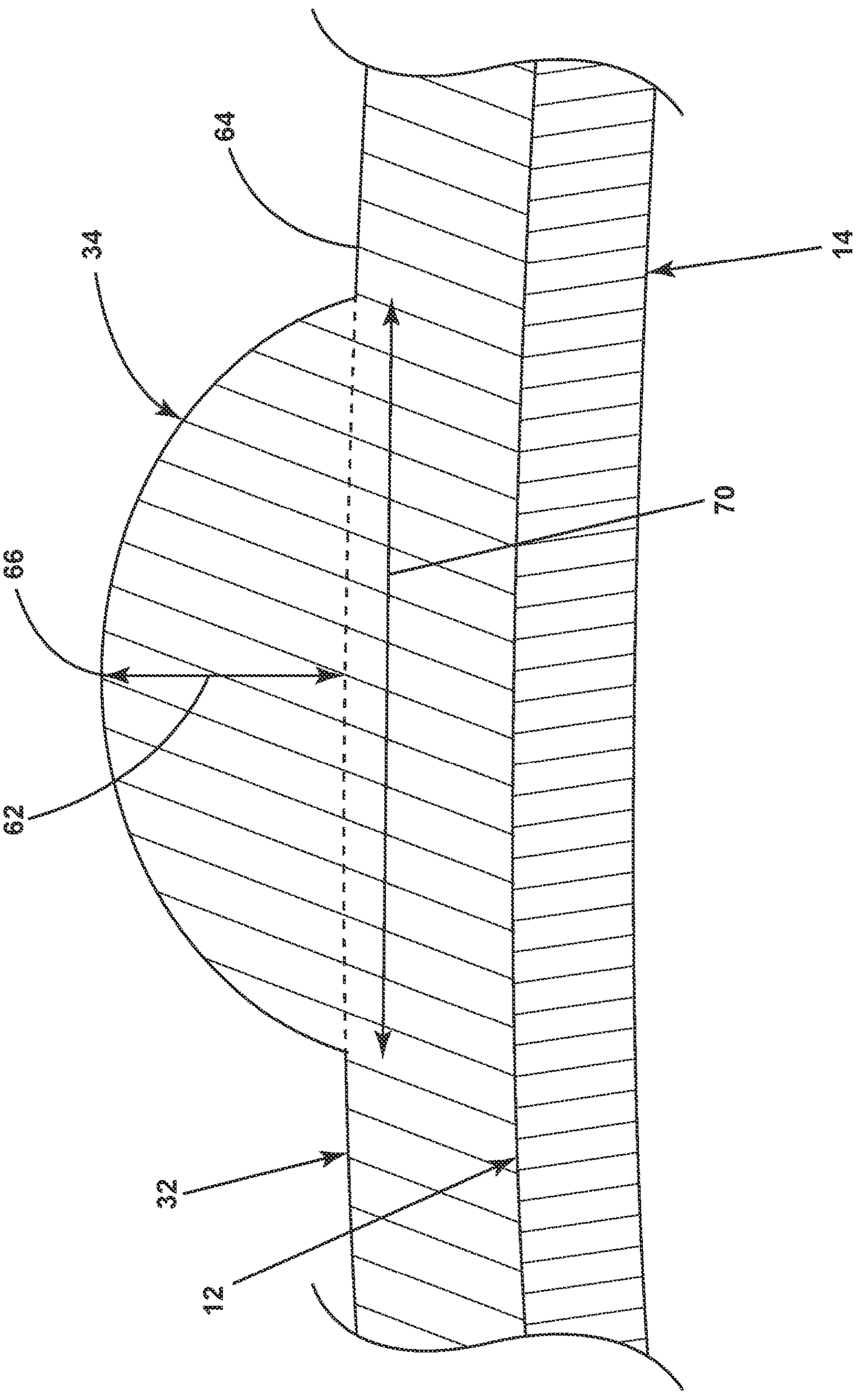
FIG. 4 is an enlarged view of a nub of the microwave dish of FIG. 1.

FIG. 4 further illustrates the nubs 34 as semi-spherical. However, the nubs 34 can be any three-dimensional shape including, but not limited to, a cylinder, a sphere, a cuboid or a combination therein. The nubs 34 can have a height 62 measured from a surface level 64 of the coating 32 to a peak point 66 or to a point that extends the farthest from the surface level 64. The height 62 can be anywhere from 2 millimeters to 12 millimeters. Additionally, or alternatively, the height can be between 12 millimeters and 14 millimeters.

A nub diameter 70 can be a diameter measurement of the semi-spherical nub 34. Alternatively, the nub diameter 70 can be the distance across the nub 34 at the widest point. The nub diameter 70 can be greater than 2 millimeters. It is contemplated that the nub diameter 70 can be between 2 millimeters and 16 millimeters. It is further contemplated that the ratio of the height to the diameter can include or be between 3:8 to 3:4.

It is contemplated that each of the plurality of nubs 34 can have similar or different dimensions. That is, the plurality of nubs 34 can all have the same height 62 or the same nub diameter 70. Alternatively, at least one of the plurality of nubs 34 can have different height or different nub diameter measurements than the other nubs.

In operation, food is placed in the body 20 of the microwave dish 10. The food in the microwave dish 10 is then cooked within a microwave oven. The coating 32 with the nubs 34 is designed, at a first pass, to match resonance with the frequency of the microwave oven. That is, the coating 32 absorbs microwave radiation by converting the microwaves into heat through matching resonance frequency. The resonance frequency can be, for example, approximately 2.45 GHz.

Heat is generated when at least a portion of the coating 32 with the nubs 34 resonates. Nanoparticles in the coating 32 contribute to the generation of heat at resonance. An increase in nanoparticle density or plurality can result in a higher maximum temperature of the body 20.

The resonance of at least a portion of the materials in the coating 32 with the nubs 34 quickly provides the body 20 with an evenly distributed source of heat. The body 20 can then quickly provide the food with evenly distributed heat that will help evenly cook the food from the outside. Additionally, or simultaneously, microwaves absorbed by the food can help cook the inside of the food.

Figure 5:
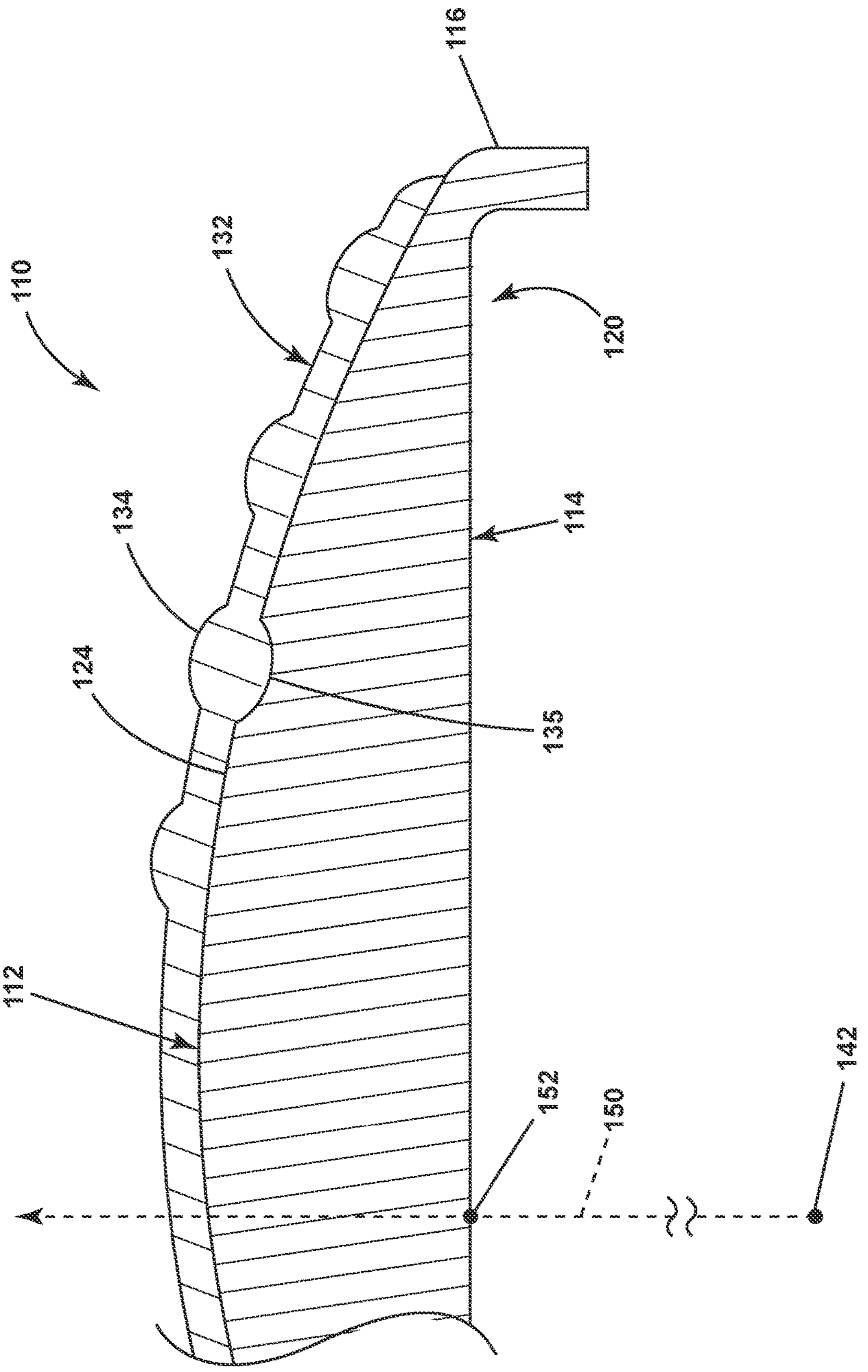
FIG. 5 is a schematic variation of the cross section of at least a portion of the microwavable dish 10 of FIG. 3.

FIG. 5 is another schematic variation of the cross section of at least a portion of a microwavable dish 110. The microwavable dish 110 is similar to the microwavable dish 10, therefore, like parts will be identified with like numerals increased by 100, with it being understood that the description of the like parts of the microwavable dish 10 applies to the microwavable dish 110, unless otherwise noted.

The microwavable dish 110 can have a bottom 112 in opposing relationship to a top 114. Optionally, the microwavable dish 110 can include sides 116 that generally extend away from the bottom 112. A body 120 can be defined by the top 114, the bottom 112, and the sides 116. The body 120 can vary in thickness.

The bottom 112 can include a microwave-absorbing dome portion 124. A microwave-absorbing coating 132 is illustrated with a plurality of nubs 134 that can be coupled to the dome portion 124. It is contemplated that the thickness of the coating 132 can vary along the bottom 112 of the microwavable dish 110. It is further contemplated that the coating 132 can fill in or penetrate the body 120 in at least one optional body recesses 135.

A geometric center 152 on the top 114 of the microwavable dish 110 can be defined as a location equidistant from the sides 116. It is contemplated that the top 114 can be planar. A line 150 passing through a center point 142 of the dome portion 124 and the geometric center 152 can be generally perpendicular to the top 114.

Figure 6:
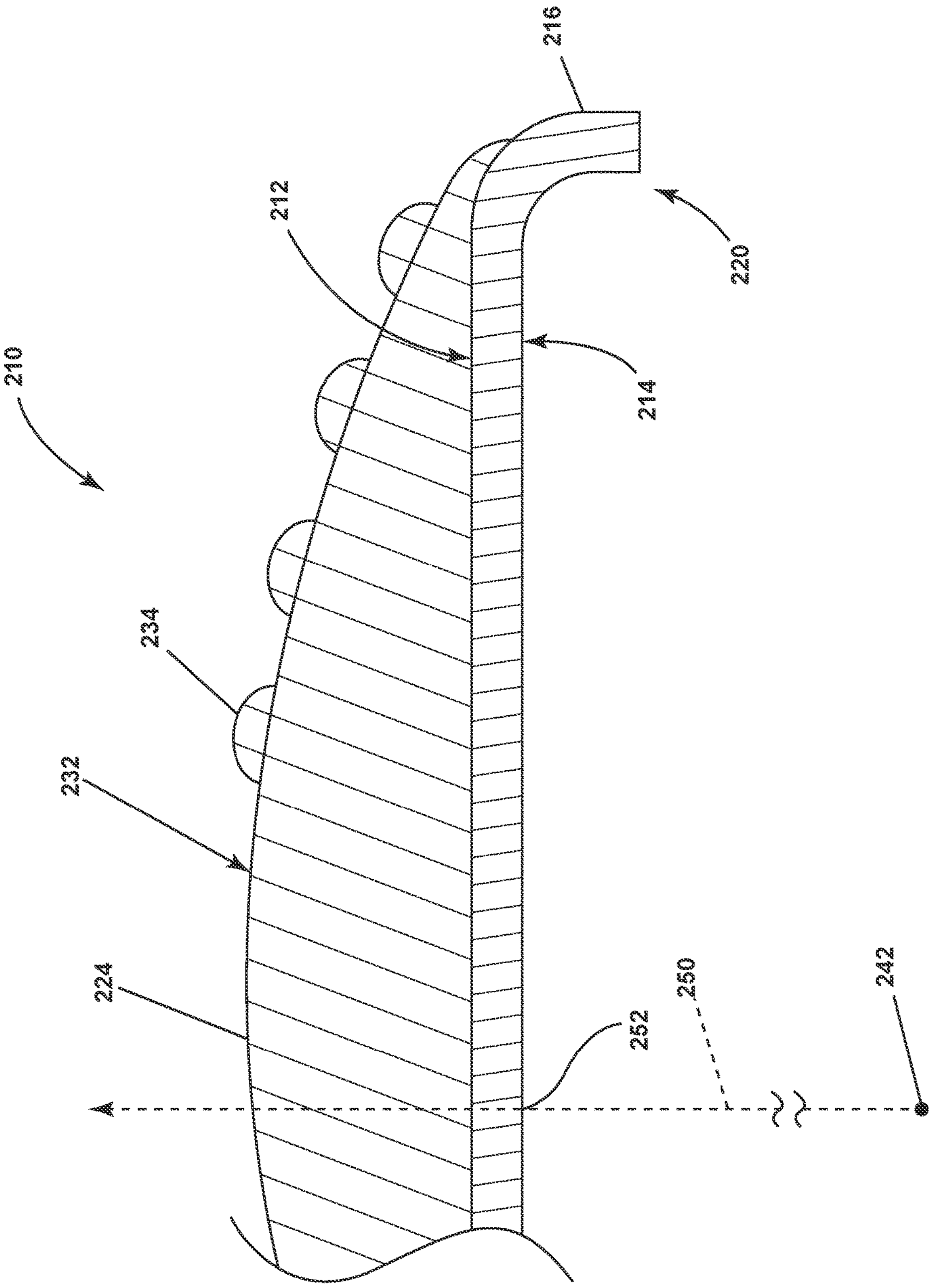
FIG. 6 is another schematic variation of the cross section of at least a portion of the microwavable dish 10 of FIG. 3.

FIG. 6 is another schematic variation of the cross section of at least a portion of a microwavable dish 210. The microwavable dish 210 is similar to the microwavable dish 10, therefore, like parts will be identified with like numerals increased by 200, with it being understood that the description of the like parts of the microwavable dish 10 applies to the microwavable dish 210, unless otherwise noted.

The microwavable dish 210 can have a bottom 212 in opposing relationship to a top 214. Optionally, the microwavable dish 210 can include sides 216 where a body 220 can be defined by the top 214, the bottom 212, and the sides 216. While illustrated with a generally uniform thickness, it is contemplated that the body 220 can vary in thickness.

A microwave-absorbing coating 232 is illustrated with a plurality of nubs 234. It is contemplated that the thickness of the coating 232 can vary along the bottom 212 of the microwavable dish 210 to form a dome portion 224.

A geometric center 252 of the top 214 can be determined as a location that is generally equidistant from the sides 216. It is contemplated that the top 214 can be planar. A line 250 passing through a center point 242 of the dome portion 224 and the geometric center 252 can be perpendicular to the top 214. However, it is contemplated that the bottom 212 or the top 214 can be curved at a different radius of curvature than the dome portion 224.

Figure 7:
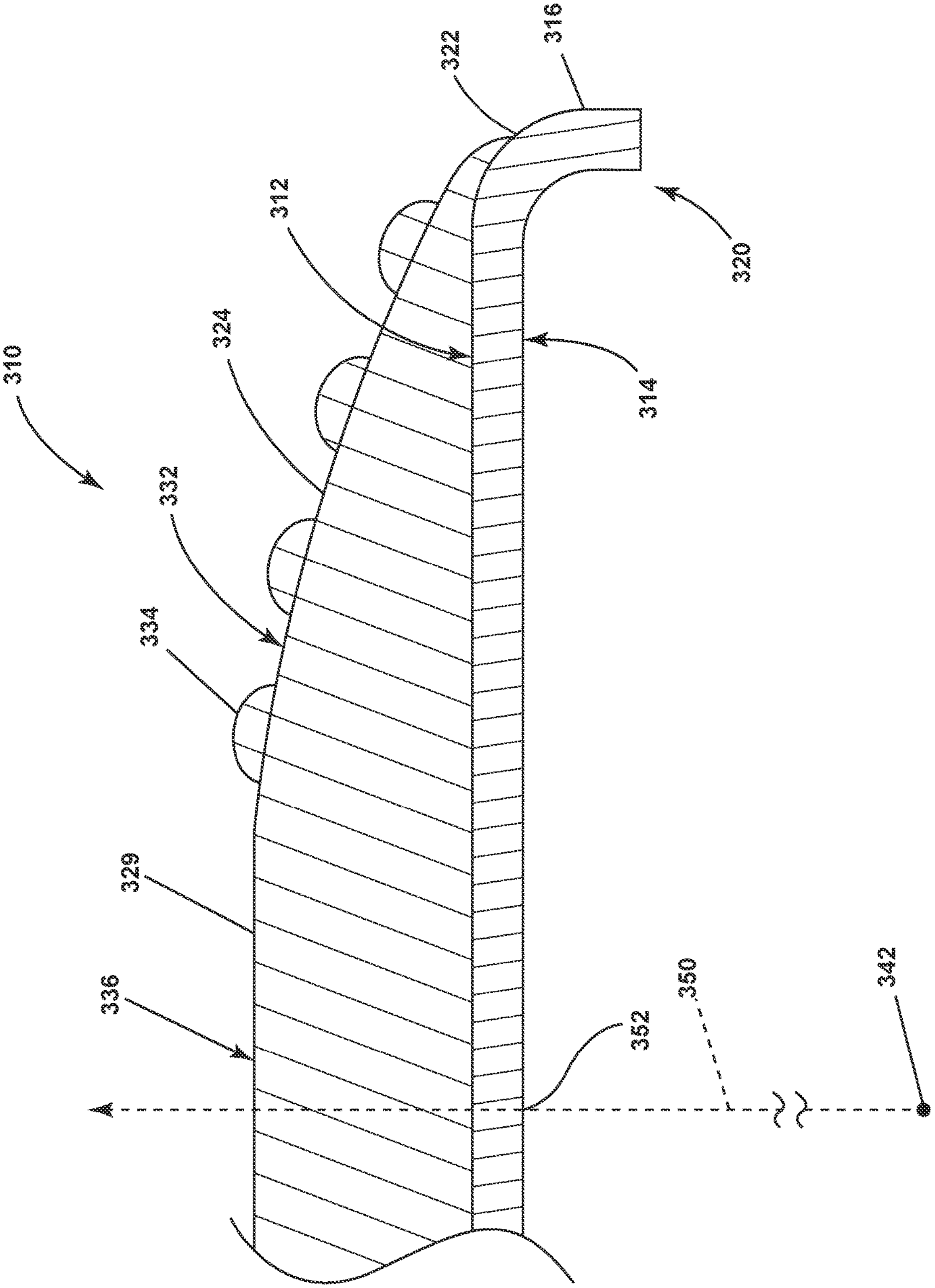
FIG. 7 is yet another schematic variation of the cross section of at least a portion of the microwavable dish 10 of FIG. 3.

FIG. 7 is another non-limiting schematic variation of the cross section of at least a portion of a microwavable dish 310. The microwavable dish 310 is similar to the microwavable dish 10, therefore, like parts will be identified with like numerals increased by 300, with it being understood that the description of the like parts of the microwavable dish 10 applies to the microwavable dish 310, unless otherwise noted.

The microwavable dish 310 can have a bottom 312 in opposing relationship to a top 314. Optionally, the microwavable dish 310 can include sides 316 where a body 320 can be defined by the top 314, the bottom 312, and the sides 316. While illustrated with a generally uniform thickness, it is contemplated that the body 320 can vary in thickness. A bottom perimeter 322 can be defined at the location where the sides 316 join the bottom 312 of the body 320.

A microwave-absorbing coating 332 is illustrated with a plurality of nubs 334. It is contemplated that the thickness of the coating 332 can vary along the bottom 312 of the microwavable dish 310 to form a dome portion 324.

A geometric center 352 of the top 314 can be determined as a location that is generally equidistant from the sides 316. It is contemplated that the top 314 can be planar. An apex area 329 can be defined as the area on the dome portion 324 furthest from a plane containing the bottom perimeter 322. The apex area 329 can form at least a portion of a circular area 336. A line 350 passing through a center point 342 and the geometric center 352 can be perpendicular to the apex area 329. That is, the apex area 329 is in a plane that is generally parallel to the plane of the top 314 or the plane containing the bottom perimeter 322.

Figure 8:
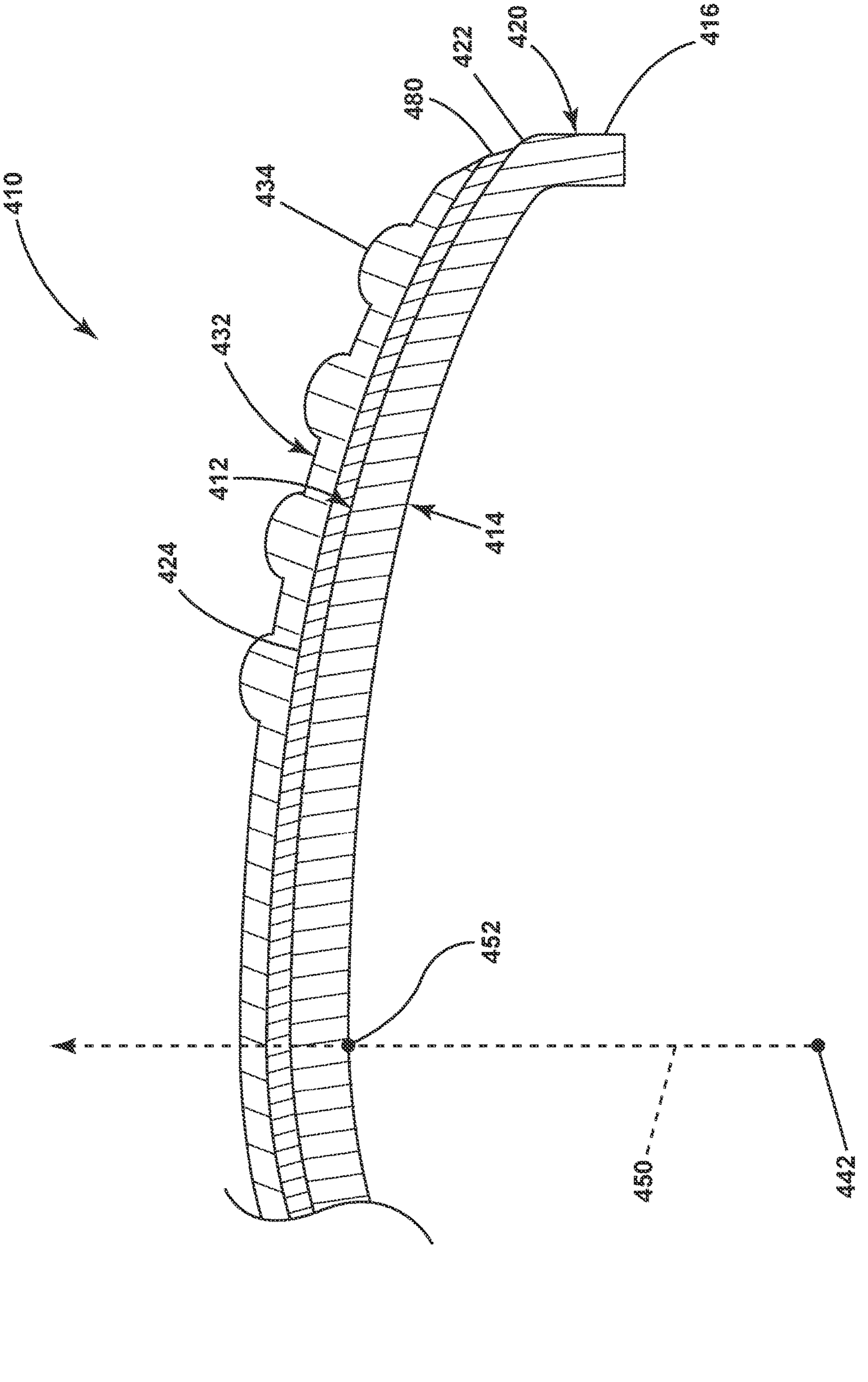
FIG. 8 is still yet another schematic variation of the cross section of at least a portion of the microwavable dish 10 of FIG. 3.

FIG. 8 is another non-limiting schematic variation of the cross section of at least a portion of a microwavable dish 410. The microwavable dish 410 is similar to the microwavable dish 10, therefore, like parts will be identified with like numerals increased by 400, with it being understood that the description of the like parts of the microwavable dish 10 applies to the microwavable dish 410, unless otherwise noted.

The microwavable dish 410 can have a bottom 412 in opposing relationship to a top 414. Optionally, the microwavable dish 410 can include sides 416 that generally extend away from the bottom 412. A body 420 can be defined by the top 414, the bottom 412, and the sides 416. The body 420 can vary in thickness.

The bottom 412 can include a microwave-absorbing dome portion 424. A microwave-absorbing coating 432 is illustrated with a plurality of nubs 434 that can be coupled to the dome portion 124. It is contemplated that the thickness of the coating 432 can vary along the bottom 412 of the microwavable dish 410.

Optionally, a transfer coating 480 can be located between the coating 432 and the body 420. The transfer coating 480 can help transfer heat from the coating 432 to the body 420. The transfer coating 480 can be made from a different material than the coating 432 or the body 420. Alternatively, the transfer coating 480 can be made of similar materials as the coating 432 or the body 420.

Benefits associated with aspects of the disclosure herein include a microwavable dish that increases in temperature quickly to enhance the cooking of the outside of a food item in a microwave. The shape of the nubs and the material used to create the nubs and the coating have special resonance characteristics that enhance the transformation of microwave radiation to heat.

Another benefit is the even distribution of heat using the coating and the nubs to more uniformly provide heat to the food in the microwavable dish.

Yet another benefit can be a reduction in power required to heat food. The material composition and structure of the coating on the microwavable dish increases the efficiency of transferring microwave radiation to heat. Therefor it will not take as long to heat or cook food items.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

ASPECTS

Various characteristics, aspects, and advantages of the present disclosure may also be embodied in the following technical solutions as defined by the clauses:

1. A microwavable dish comprising:

a top having a surface adapted to hold a food item, and reflect microwaves; a bottom in opposing relationship to the top having dome portion that absorbs microwaves; and a plurality of nubs projecting from the dome portion.

2. The microwavable dish of aspect 1 wherein the dome portion further comprises a microwave-absorbing coating.

3. The microwavable dish of aspect 2 wherein the coating comprises a plurality of nanoparticles.

4. The microwavable dish of aspect 3 wherein the coating is applied to at least some of the nubs.

5. The microwavable dish of aspect 3 wherein the coating is thickened to form at least some of the nubs.

6. The microwavable dish of any of aspects 1-5 wherein the dome portion defines a radius of curvature with a center point.

7. The microwavable dish of any of aspects 1-6 wherein the top is planar.

8. The microwavable dish of any of aspects 1-7 wherein the dome portion further comprises an apex.

9. The microwavable dish of aspect 8 wherein the nubs are absent within a circular area centered on the apex and having a radius up to at least 50% of a radius of curvature of the dome portion.

10. The microwavable dish of aspect 9 wherein the nubs are otherwise substantially equally distributed on the dome portion.

11. The microwavable dish of any of aspects 1-10 wherein the nubs are arranged in a matrix.

12. The microwavable dish of any of aspects 1-11 wherein the nubs have a height to a diameter ratio including and between 3:8 and 3:4.

13. The microwavable dish of any of aspects 1-12 wherein the nubs are semi-spherical.

14. A microwavable dish comprising:

a body having a top and an opposing bottom;

a surface adapted to hold a food item define by the top;

a dome portion defined by the bottom; and a microwave-absorbing, nanoparticle coating applied to at least a portion of the dome portion forming or coating a plurality of projecting nubs.

15. The microwavable dish of aspect 14 wherein a plurality of nanoparticles in the nanoparticle coating is applied to both the dome portion and the nubs.

16. The microwavable dish of any of aspects 14-15 wherein a plurality of nanoparticles in the nanoparticle coating is applied to the dome portion and thickened to form the nubs.

17. The microwavable dish of any of aspects 14-16 wherein the nubs are semi-spherical.

18. The microwavable dish of any of aspects 14-17 wherein the nubs have a height of 2-12 mm and a diameter of 2-20 mm.

19. The microwavable dish of any of aspects 14-18 wherein the dome portion defines a radius of curvature and the nubs are absent from an area in a center of the dome portion, with the area comprises between 0 and 75 percent of a total surface area of the dome portion.

20. The microwavable dish of any of aspects 14-19 wherein the body is non-microwave-absorbable.

Additionally, or alternatively, various characteristics, aspects, and advantages of the present disclosure may also be embodied in the following technical solutions as defined by the clauses:

1. A microwavable dish comprising:

a body having a top and an opposing bottom;

a surface adapted to hold a food item defined by the top;

a dome portion defined by the bottom; and a microwave-absorbing, nanoparticle coating applied to at least a portion of the dome portion forming or coating a plurality of projecting nubs.

2. The microwavable dish of aspect 1 wherein a plurality of nanoparticles in the nanoparticle coating is applied to both the dome portion and the plurality of projecting nubs.

3. The microwavable dish of any of aspects 1-2 wherein a plurality of nanoparticles in the nanoparticle coating is applied to the dome portion and thickened to form the plurality of projecting nubs.

4. The microwavable dish of any of aspects 1-3 wherein the dome portion defines a plurality of protrusions, and wherein a plurality of nanoparticles in the nanoparticle coating is applied to the plurality of protrusions to form the plurality of projecting nubs.

5. The microwaveable dish of aspect 4 wherein plurality of nanoparticles in the nanoparticle coating is applied to the plurality of protrusions and thickened to form the plurality of projecting nubs.

6. The microwavable dish of any of aspects 1-5 wherein the plurality of projecting nubs are semi-spherical.

7. The microwavable dish of aspect 6 wherein the plurality of projecting nubs have a height of 2-12 mm and a diameter of 2-20 mm.

8. The microwavable dish of any of aspects 1-7 wherein the dome portion defines a radius of curvature and the plurality of projecting nubs are absent from an area in a center of the dome portion, with the area comprising between 0 and 75 percent of a total surface area of the dome portion.

9. The microwavable dish of any of aspects 1-8 wherein the body is non-microwave-absorbable.

10. The microwaveable dish of any of aspects 1-9, wherein the plurality of nubs are arranged in a matrix that includes the plurality of nubs arranged in rows and columns.

11. The microwaveable dish of aspect 10, wherein the rows of the plurality of nubs are generally perpendicular to the columns of the plurality of nubs.

12. The microwaveable dish of any of aspects 1-11 wherein the nanoparticle coating comprises at least one of carbon nanotubes, graphene, carbon nanofibrils, ceramic composites, or nanocrystalline ceramic nanoparticles.

13. The microwaveable dish of any of aspects 1-12 wherein the nanoparticle coating is selected to match resonance with a frequency of microwaves of a microwave oven.

14. The microwaveable dish of aspect 13 wherein the nanoparticle coating is selected to operably absorb the microwaves of the microwave oven and convert the absorbed microwaves into heat.

15. The microwaveable dish of any of aspects 1-14 wherein the microwave-absorbing, nanoparticle coating is applied to at least a portion of the body forming or coating the dome portion.

16. The microwaveable dish of aspect 15 wherein a plurality of nanoparticles in the nanoparticle coating is applied to the body at varied thickness to form the dome portion.

17. The microwaveable dish of aspect 16 wherein the top of the body defines a planar surface, and wherein the nanoparticle coating is applied to the planar surface at varied thickness to form the dome portion extending from the top of the body.

18. A microwavable dish comprising:

a top having a surface adapted to hold a food item and to reflect microwaves;

a bottom in opposing relationship to the top and having a concave dome portion that is adapted to absorb microwaves;

sides that extend away from the bottom and define a bottom perimeter at a location where the sides join the bottom, wherein the concave dome portion extends downwardly away from and below the bottom perimeter;

a plurality of nubs projecting from the concave dome portion; and a microwave-absorbing, nanoparticle coating applied to at least a portion of the dome portion forming or coating a plurality of projecting nubs.

19. The microwavable dish of aspect 18 wherein a plurality of nanoparticles in the nanoparticle coating is applied to both the dome portion and the plurality of projecting nubs.

20. The microwavable dish of any of aspects 18-19 wherein a plurality of nanoparticles in the nanoparticle coating is applied to the dome portion and thickened to form the plurality of projecting nubs.

What is claimed is:

1. A microwavable dish comprising:

a body having a top and an opposing bottom;

a surface adapted to hold a food item defined by the top;

a dome portion defined by the bottom; and a microwave-absorbing, nanoparticle coating applied to at least a portion of the dome portion forming or coating a plurality of projecting nubs, wherein the plurality of nubs are arranged in a matrix that includes the plurality of nubs arranged in rows and columns.

2. The microwavable dish of claim 1 wherein a plurality of nanoparticles in the nanoparticle coating are applied to both the dome portion and the plurality of projecting nubs.

3. The microwavable dish of claim 1 wherein a plurality of nanoparticles in the nanoparticle coating are applied to the dome portion and thickened to form the plurality of projecting nubs.

4. The microwavable dish of claim 1 wherein the dome portion defines a plurality of protrusions, and wherein a plurality of nanoparticles in the nanoparticle coating are applied to the plurality of protrusions to form the plurality of projecting nubs.

5. The microwavable dish of claim 4 wherein the plurality of nanoparticles in the nanoparticle coating is applied to the plurality of protrusions and thickened to form the plurality of projecting nubs.

6. The microwavable dish of claim 1 wherein the plurality of projecting nubs are semi-spherical.

7. The microwavable dish of claim 6 wherein the plurality of projecting nubs have a height of 2-12 mm and a diameter of 2-20 mm.

8. The microwavable dish of claim 1 wherein the dome portion defines a radius of curvature and the plurality of projecting nubs are absent from an area in a center of the dome portion, with the area comprising between 0 and 75 percent of a total surface area of the dome portion.

9. The microwavable dish of claim 1 wherein the body is non-microwave-absorbable.

10. The microwavable dish of claim 1, wherein the rows of the plurality of nubs are generally perpendicular to the columns of the plurality of nubs.

11. The microwavable dish of claim 1 wherein the nanoparticle coating comprises at least one of carbon nanotubes, graphene, carbon nanofibrils, ceramic composites, or nanocrystalline ceramic nanoparticles.

12. The microwavable dish of claim 1 wherein the nanoparticle coating is selected to match resonance with a frequency of microwaves of a microwave oven.

13. The microwavable dish of claim 12 wherein the nanoparticle coating is selected to operably absorb the microwaves of the microwave oven and convert the absorbed microwaves into heat.

14. The microwaveable dish of claim 1 wherein the microwave-absorbing, nanoparticle coating is applied to at least a portion of the body forming or coating the dome portion.

15. The microwavable dish of claim 14 wherein a plurality of nanoparticles in the nanoparticle coating is applied to the body at varied thickness to form the dome portion.

16. The microwavable dish of claim 15 wherein the top of the body defines a planar surface, and wherein the nanoparticle coating is applied to the planar surface at varied thickness to form the dome portion extending from the top of the body.

17. A microwavable dish comprising:

a top having a surface adapted to hold a food item and to reflect microwaves;

a bottom in opposing relationship to the top and having a concave dome portion that is adapted to absorb microwaves;

sides that extend away from the bottom and define a bottom perimeter at a location where the sides join the bottom, wherein the concave dome portion extends downwardly away from and below the bottom perimeter;

a plurality of nubs projecting from the concave dome portion; and a microwave-absorbing, nanoparticle coating applied to at least a portion of the dome portion forming or coating the plurality of projecting nubs, wherein the nanoparticle coating is selected to match resonance with a frequency of microwaves of a microwave oven.

18. The microwavable dish of claim 17 wherein a plurality of nanoparticles in the nanoparticle coating are applied to both the dome portion and the plurality of projecting nubs.

19. The microwavable dish of claim 17 wherein a plurality of nanoparticles in the nanoparticle coating are applied to the dome portion and thickened to form the plurality of projecting nubs.

20. A microwavable dish comprising:

a body having a top and an opposing bottom;

a surface adapted to hold a food item defined by the top;

a dome portion defined by the bottom; and a microwave-absorbing, nanoparticle coating applied to at least a portion of the dome portion forming or coating a plurality of projecting nubs, wherein the nanoparticle coating comprises at least one of carbon nanotubes, graphene, carbon nanofibrils, ceramic composites, or nanocrystalline ceramic nanoparticles.

* * * * *